(12) United States Patent  
Moghe et al.

(10) Patent No.: US 12,088,222 B2
(45) Date of Patent: Sep. 10, 2024

(54) SOFT START FOR POWER TOOL WITH MOMENTARY SWITCH AND MECHANICAL DIRECTION SELECTION SWITCH

(71) Applicant: Ridge Tool Company, Elyria, OH (US)

(72) Inventors: Abhishek Suhas Moghe, Pune (IN); Naga Penmetsa, Westlake, OH (US)

(73) Assignee: Ridge Tool Company, Elyria, OH (US)

( * ) Notice: Subject to any disclaimer, the term of this patent is extended or adjusted under 35 U.S.C. 154(b) by 678 days.

(21) Appl. No.: 17/161,799

(22) Filed: Jan. 29, 2021

(65) Prior Publication Data

US 2021/0159818 A1 May 27, 2021

(30) Foreign Application Priority Data

Apr. 30, 2020 (IN) .............................. 202021018474

(51) Int. Cl.
*H02P 1/02* (2006.01)
*H02P 23/24* (2016.01)

(52) U.S. Cl.
CPC ................ *H02P 1/02* (2013.01); *H02P 23/24* (2016.02)

(58) Field of Classification Search
CPC .................................. H02P 1/02; H02P 23/24
See application file for complete search history.

(56) References Cited

U.S. PATENT DOCUMENTS

| 1,538,698 A | 5/1925 | Hall |
| 3,317,943 A | 5/1967 | Primm |
| 6,421,871 B1 | 7/2002 | Peach et al. |
| 7,367,077 B2 | 5/2008 | Rutkowski et al. |
| 8,646,143 B2 | 2/2014 | Lokkinen et al. |
| 9,138,818 B2 | 9/2015 | Chartier et al. |
| 9,265,263 B2 | 2/2016 | Whited et al. |
| 2009/0015183 A1* | 1/2009 | Watanabe ............... H02H 11/00 318/479 |
| 2012/0180545 A1* | 7/2012 | Wilson, Jr. ............. B21D 7/022 72/449 |
| 2015/0314434 A1* | 11/2015 | Bevins, Jr. ............... H02G 1/02 408/124 |
| 2016/0111984 A1* | 4/2016 | Koizumi ................... H02P 6/28 318/400.22 |
| 2016/0204718 A1* | 7/2016 | Koizumi ................... B25F 5/00 318/400.18 |

(Continued)

FOREIGN PATENT DOCUMENTS

| CA | 2334293 | 8/2001 |
| DE | 3222065 A | 12/1983 |

(Continued)

OTHER PUBLICATIONS

Large Clog Dog; https://www.clogsquad.com/product/116897/large-clog-dog; 3 pages.

(Continued)

*Primary Examiner* — Zoheb S Imtiaz
(74) *Attorney, Agent, or Firm* — Mark Bandy; Rankin Hill & Clark, LLP

(57) ABSTRACT

Soft start systems for electrically powered tools are described. The soft start systems use direction feedback signal(s) from a direction selection switch of the power tool. Also described are power tools using such soft start systems. In addition, electrical power circuits using the soft start systems are described.

31 Claims, 19 Drawing Sheets

(56) References Cited

U.S. PATENT DOCUMENTS

| | | | |
|---|---|---|---|
| 2017/0268216 A1 | 9/2017 | Cole et al. | |
| 2018/0085797 A1 | 3/2018 | Beyer | |
| 2019/0111551 A1* | 4/2019 | Kato | B25F 5/001 |
| 2020/0099276 A1* | 3/2020 | Mancl | H01R 39/381 |

FOREIGN PATENT DOCUMENTS

| | | |
|---|---|---|
| DE | 3433550 A | 3/1986 |
| DE | 19641624 A1 | 4/1998 |
| GB | 2117078 | 10/1983 |

OTHER PUBLICATIONS

Mini Cleaner; https://www.picotesolutions.com/drain-cleaning; 3 pages.

Picote Maxi Miller Power + Operator's Manual; https://www.picotesolutions.com/operating-manuals; Jan. 9, 2019; 23 pages.

Picote Maxi Miller Operator's Manual; https://www.picotesolutions.com/operating-manuals; Jan. 9, 2019; 20 pages.

Picote Super Midi Miller Operator's Manual; https://www.picotesolutions.com/operating-manuals; Jan. 9, 2019; 20 pages.

Picote Midi Miller Operator's Manual; https://www.picotesolutions.com/operating-manuals; Jan. 9, 2019; 17 pages.

Picote Mini Miller Operator's Manual; https://www.picotesolutions.com/operating-manuals; Jan. 9, 2019; 22 pages.

Picote Micro Miller Operator's Manual; https://www.picotesolutions.com/operating-manuals; Jan. 9, 2019; 22 pages.

RCM-10, RCM-25, RCM-36 Cleaning units product brochure; https://www.renssi.com/en/products/machines-and-equipment/rom-machines/; Mar. 18, 2019; 2 pages.

RCM-10 Safety and Instruction Manual; https://www.renssi.com/en/services/; Jan. 2019; 12 pages.

RCM-25 Safety and Instruction Manual; https://www.renssi.com/en/services/; Jan. 2018; 16 pages.

RCM-36 Safety and Instruction Manual; https://www.renssi.com/en/services/; Jan. 2018; 16 pages.

ZIP-ZIP Fleet Stationary Drum and ZIP-ZIP Revolution Rotating Drum; https://www.drainrehabsolutions.com/; 7 pages.

Office Action dated Nov. 17, 2021; Application No. DE102021201359.7; 12 pages.

* cited by examiner

SOFT START FOR POWER TOOL WITH MOMENTARY SWITCH AND MECHANICAL DIRECTION SELECTION SWITCH

CROSS REFERENCES TO RELATED APPLICATIONS

This application claims priority from India provisional application Serial No. 202021018474 filed Apr. 30, 2020.

FIELD

The present disclosure relates to the field of power tools such as threading machines and drain cleaning machines. More particularly, the present disclosure relates to power circuits for power tools, soft start systems, and power tools using such soft start systems.

BACKGROUND

Power tools such as threading machines are typically powered by a universal motor and utilize a momentary switch, for example a foot switch, and a mechanical direction selection switch, which can be a rotary switch for example, to control power flow from an AC power source to the universal motor. Currently, threading machines are not equipped with a soft start circuit. In conventional soft start circuits, a soft start algorithm is utilized with the assistance of current feedback and control circuitry on circuit boards.

However, conventional soft start circuits are not suitable for threading machines. Typically, this is because of the use of both a momentary switch and a mechanical direction switch in threading machines. Further, circuit board(s) associated with currently known soft start circuits cannot be used for different machines or tools, and particularly those utilizing controls such as in threading machines. That is, due to the particular control configuration of many if not all threading machines, conventional circuitry for traditional soft start circuits is not appropriate for use in such threading machines. Another drawback with conventional soft start circuits is that in the absence of directional feedback, a HOT start can occur if a user operates a machine with a momentary switch blocked condition, which is not acceptable according to IEC62481 and IEC61000:3-3 standards.

Another issue associated with threading machines provided with a momentary switch and a mechanical direction switch is that power to the machine, and particularly to the armature winding of the motor, is controlled through both the momentary switch and the mechanical direction switch. More specifically, unless both switches are ON, the threading machine cannot turn ON. Hence, it is necessary to identify the position of the mechanical direction switch and use this information to control the soft start algorithm.

Therefore, a need exists for a soft start circuit and related provisions for a power tool with a momentary switch and a mechanical direction selection switch which alleviates the aforementioned drawbacks.

SUMMARY

The difficulties and drawbacks associated with previous approaches are addressed in the present disclosure as follows.

In one aspect, the present disclosure provides an electrical power circuit comprising a momentary switch, a direction selection switch, a soft start system, and at least one direction feedback signal from the direction selection switch to the soft start system.

In another aspect, the present disclosure provides a soft start system comprising a momentary switch for switching an electrical power source. The momentary switch provides a momentary switch actuation signal. The soft start system also comprises a zero crossing detection provision for providing a zero crossing detection input AC supply. The soft start system additionally comprises a driver for switching and controlling the electrical power source. The driver has an input for receiving a driver control signal. The soft start system also comprises a direction selection switch for switching the motor rotation direction. The direction selection switch provides a forward direction signal and a reverse direction signal. The soft start system also comprises a microcontroller for performing a soft start algorithm. The microcontroller receives the momentary switch actuation signal, the zero crossing detection signal, the forward direction signal, or the reverse direction signal. The microcontroller is configured to generate a driver control signal using the soft start algorithm. The driver control signal is provided to the input of the driver.

In still another aspect, the present disclosure provides a power tool comprising an electric motor providing a rotary output, a momentary switch for switching an electrical power source to the motor, a direction selection switch for switching the motor rotation direction to the motor, and a soft start system for controlling operation of the electric motor.

In yet another aspect, the present disclosure provides a power tool comprising an electric motor providing a rotary output, and a soft start system for controlling operation of the electric motor. The soft start system includes (i) a momentary switch for switching an electrical power source, the momentary switch providing a momentary switch actuation signal, (ii) a zero crossing detection provision for providing a zero crossing detection signal, (iii) a driver for switching and controlling the electrical power source, the driver having an input for receiving a driver control signal, (iv) a direction selection switch for switching the motor rotation direction, the direction selection switch providing a forward direction signal and a reverse direction signal, and (v) a microcontroller for performing a soft start algorithm. The microcontroller receives the momentary switch actuation signal, the zero crossing detection signal, the forward direction signal, and the reverse direction signal. The microcontroller is configured to generate a driver control signal using the soft start algorithm. The driver control signal is provided to the input of the driver.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Some of the objects of the present disclosure, which at least one embodiment herein satisfies, are as follows:

An object of the present disclosure is to provide a soft start for a power tool with a momentary switch and a mechanical direction selection switch.

Another object of the present disclosure is to provide a soft start for a power tool with a momentary switch and a mechanical direction selection switch which facilitates presence of direction detection.

Yet another object of the present disclosure is to provide a soft start for a power tool with a momentary switch and a mechanical direction selection switch which facilitates a soft start without the need for a current sensor.

Still another object of the present disclosure is to provide a soft start for a power tool with a momentary switch and a mechanical direction selection switch which provides a solution and remedies problems otherwise associated with threading machines which include a momentary switch and a direction switch.

Another object of the present disclosure is to provide a soft start for a power tool with a momentary switch and a mechanical direction selection switch which can be used for threading machines operating in a power range of 0.5HP to 3HP.

Power tools such as threading machines with a momentary switch and a mechanical direction selection switch typically include a plurality of switch positions or combinations of positions to control the flow of power from an AC power source or supply to the motor of the power tool. Typically, both the momentary switch and the mechanical direction selection switch are connected in series and hence unless both are ON, the motor cannot be turned ON.

The term "soft start" as used herein refers to a characteristic of an electric motor gradually transitioning to a typical or desired rotary output speed associated with power tool operation. For example, this gradual transitioning typically occurs when an electric motor is activated and its rotary output is increased from 0 RPM to a speed of about 18,100 RPM, within a time period of from 0 msec to 800 msec.

Figure 1:
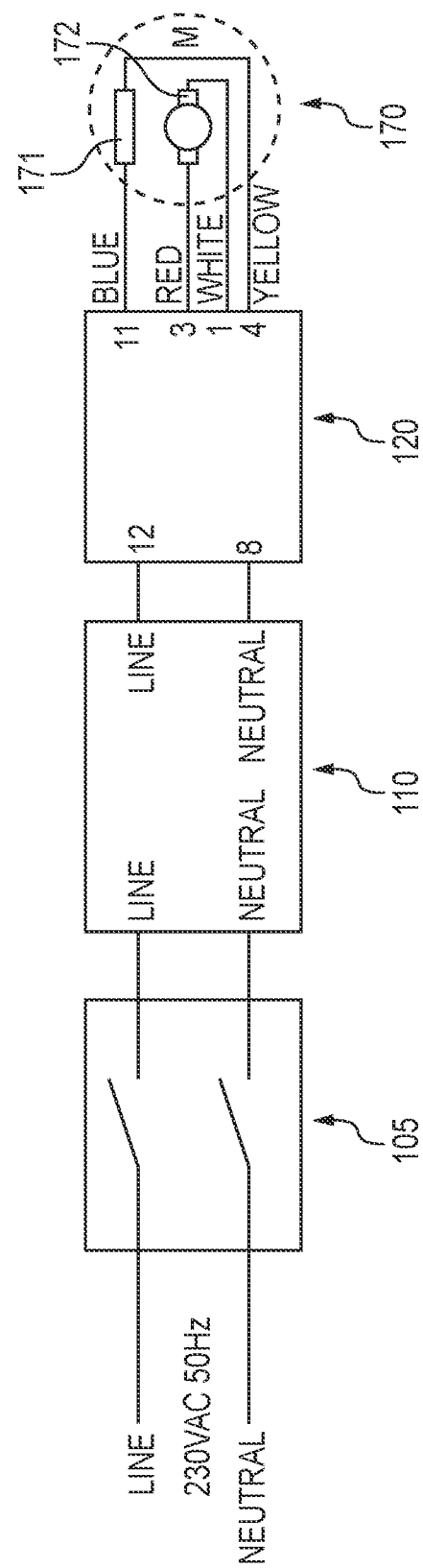
FIG. 1 illustrates a system schematic block diagram of a power circuit in a conventional threading machine.

FIG. 1 shows a system schematic block diagram of a power circuit in a conventional threading machine. Such threading machines are typically equipped with a universal motor having field and armature windings. The direction of the motor is reversed by changing the direction of current flowing through the armature winding. Specifically, FIG. 1 illustrates a momentary switch 105, which as previously noted can be in the form of a foot switch. FIG. 1 also illustrates a suppressor 110, which for example can be a surge protector which limits voltage supplied to motor and/or other electrical components. Suppressors or surge protectors protect against voltage spikes. FIG. 1 additionally illustrates a mechanical direction selection switch 120 or "directional switch" or "direction switch", as periodically referenced herein. The suppressor 110 is disposed between and in electrical communication with the momentary switch 105 and the mechanical direction switch 120. FIG. 1 also illustrates a motor 170. The mechanical direction selection switch 120 is disposed between and in electrical communication with the suppressor 110 and the motor 170. The motor 170 includes a field winding 171 and an armature winding 172, as known in the art.

Figure 2:
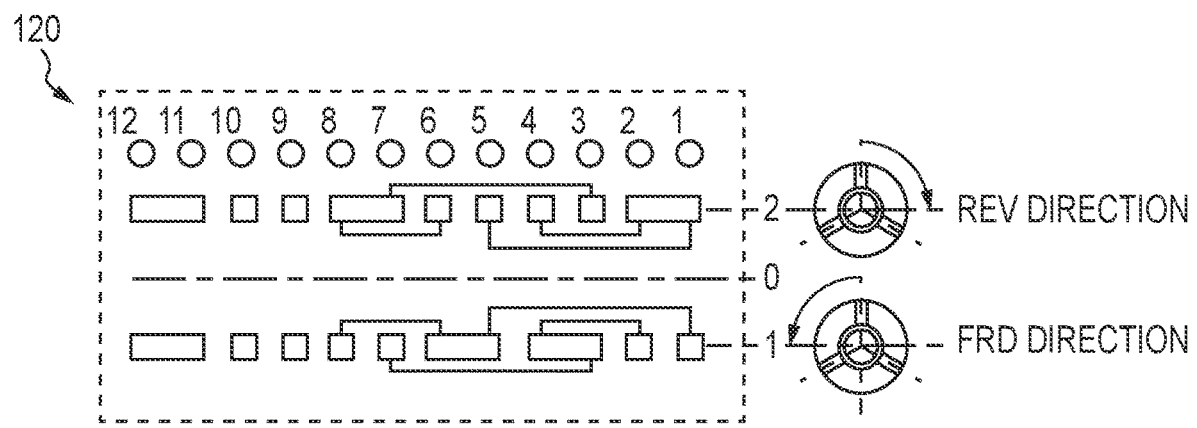
FIG. 2 illustrates an internal schematic structure of a direction selection switch.
Figure 3:
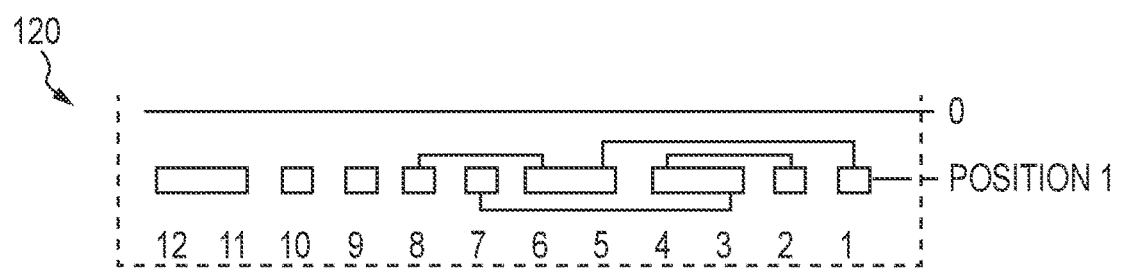
FIG. 3 illustrates electrical connections of a direction switch in a forward (FWD) direction.
Figure 4:
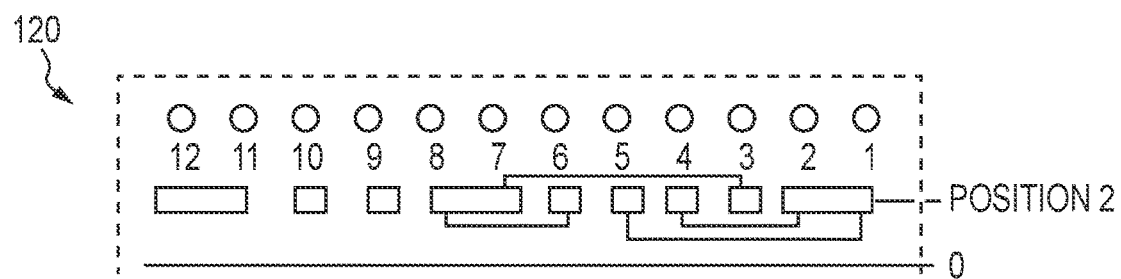
FIG. 4 illustrates electrical connections of a direction switch in a reverse (REV) direction.
Figure 5:
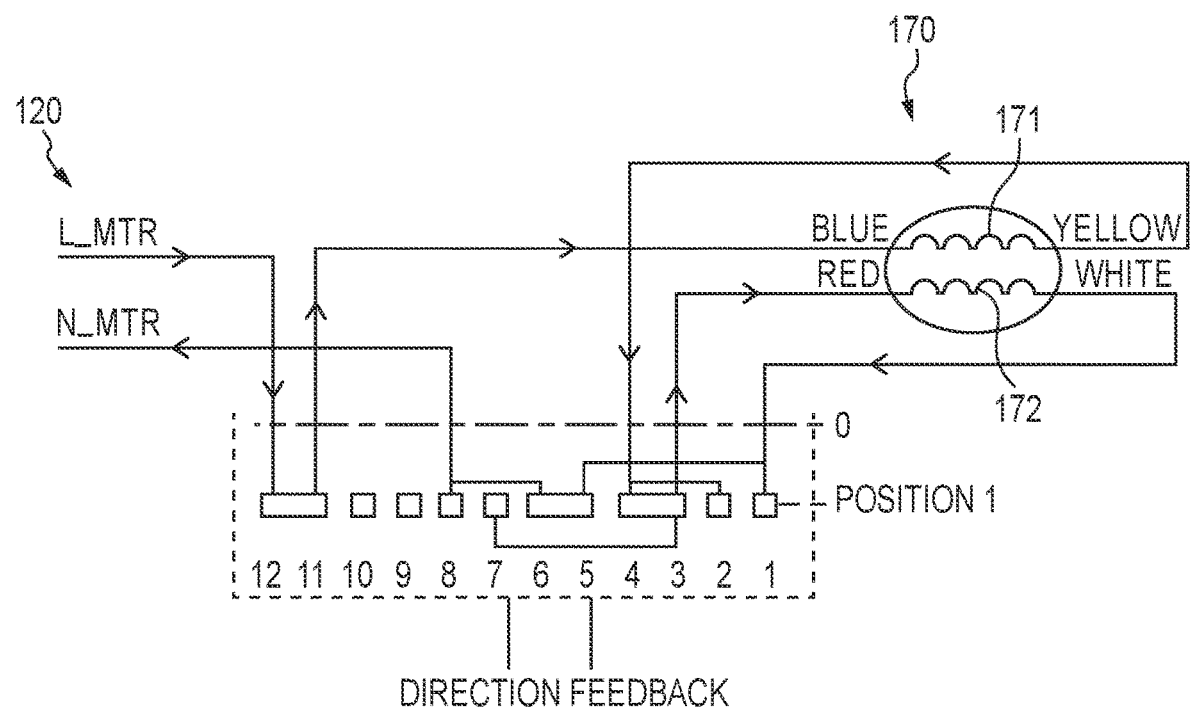
FIG. 5 illustrates direction of current flowing through an armature winding in a motor of the threading machine and the direction switch in the forward (FWD) direction.
Figure 5:
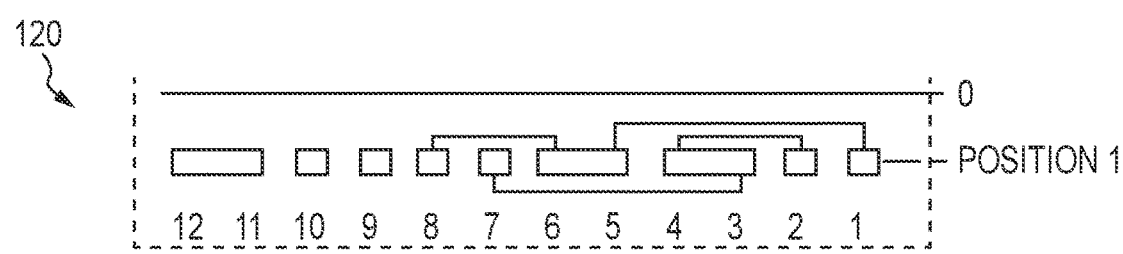

The mechanical direction switch such as switch 120, is used to change the direction of rotation of the motor from a forward (FRD) direction to a reverse (REV) direction. FIG. 2 shows an internal schematic structure of the direction switch 120. FIG. 3 is a detailed view of a portion of the internal schematic structure of the direction switch 120, illustrating representative contacts and their numbering for the motor 170 to rotate in the FRD direction (position 1). FIG. 4 is a detailed view of a portion of the internal schematic structure of the direction switch 120, illustrating representative contacts and their numbering for the motor 170 to rotate in the REV direction (position 2). From FIG. 2, it can be seen that switch contacts 8-6, 7-3, 4-2, 5-1 are always in electrical connection or "short circuited." When the direction switch 120 is in the FRD direction, along with the above noted contacts of FIG. 2, contacts 12-11, 6-5, 4-3 are also short circuited, as seen in FIG. 3. Whereas when the direction switch 120 is in the REV direction, along with the above noted contacts of FIG. 2, contacts 12-11, 8-7, 1-2 are short circuited, as seen in FIG. 4. Once the momentary switch 105 is pressed or otherwise actuated, AC input voltage will be available at the input of the FRD/REV mechanical direction selection switch 120 contacts 12 and 8. If the mechanical direction selection switch 120 is positioned in the FRD direction, the direction of current flowing through the armature winding is as shown in FIG. 5. If the mechanical direction selection switch 120 is positioned in the REV direction, the direction of electrical current flowing through the armature winding changes is as shown in FIG. 6.

Figure 6:
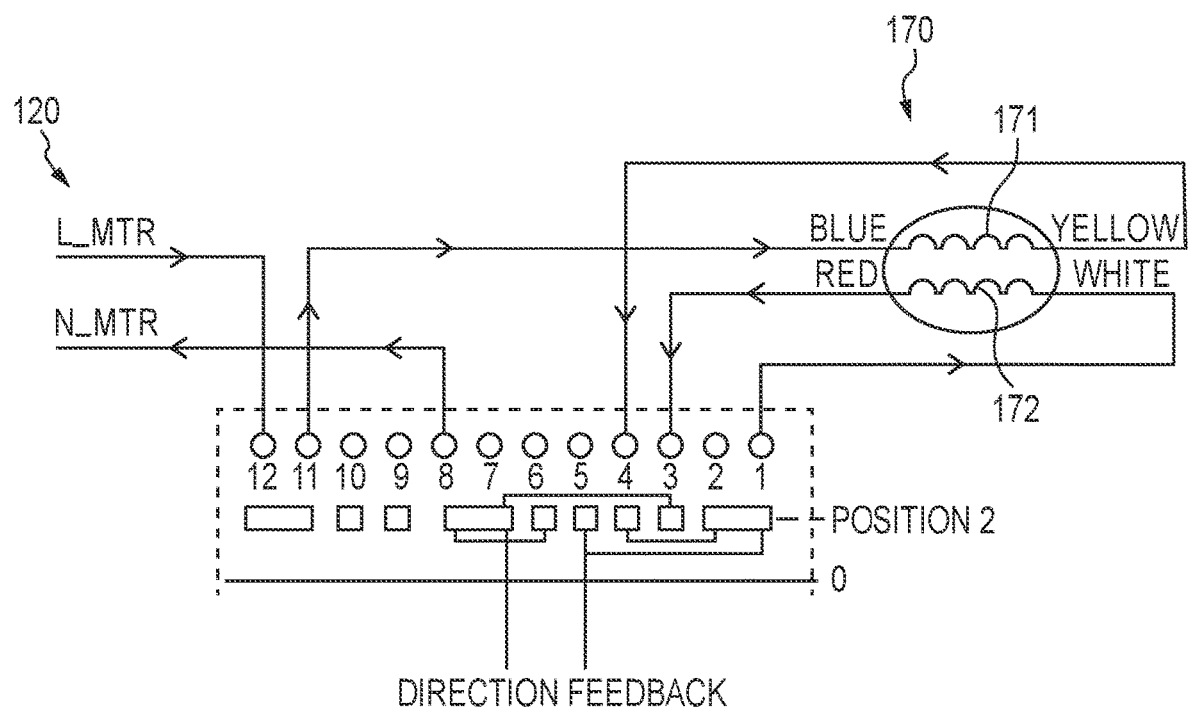
FIG. 6 illustrates change in direction of current flowing through the armature winding in the noted motor and the direction switch in the reverse (REV) direction.
Figure 6:
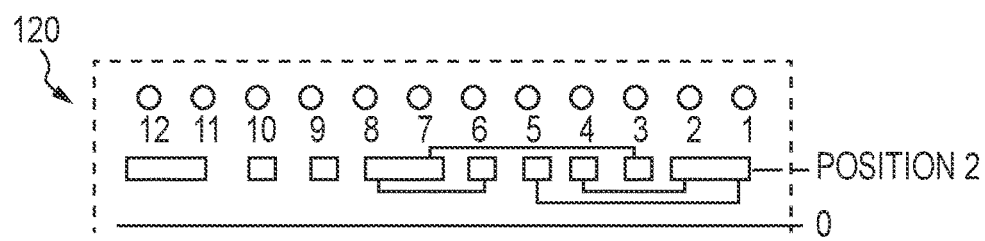

Comparing FIG. 5 and FIG. 6, it can be seen that the armature winding voltage direction changes with respect to the position of the mechanical direction selection switch, such as switch 120, and hence it is possible to detect the direction of motor operation, if the armature voltage is properly sensed.

A preferred embodiment of a soft start system, according to the present disclosure, for a power tool with a momentary switch, for example a foot switch 105, and a mechanical direction selection switch, for example switch 120, will now be described in detail with reference to the noted figures.

Figure 7:
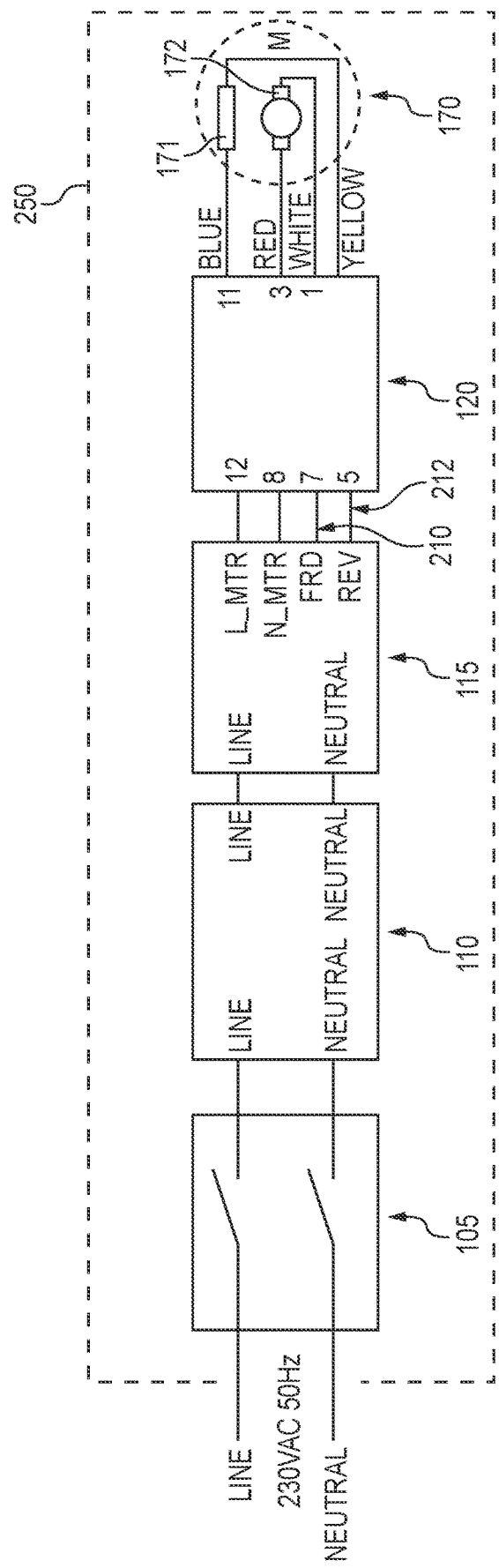
FIG. 7 illustrates a system schematic block diagram of a power circuit with a soft start circuit board incorporated in a power tool, in accordance with an embodiment of the present disclosure.

FIG. 7 shows a system schematic block diagram of a power circuit comprising a soft start system, circuit, or board 115 in accordance with an embodiment of the present disclosure. The power circuit is utilized in a power tool 250 as described herein. The soft start system, circuit, or board 115 is disposed between the suppressor 110 and the mechanical direction selection switch 120 and one or more direction feedback signal(s) 210, 212 are provided to the soft start board 115 avoid the above mentioned HOT start issue. Referring further to FIG. 7, the suppressor 110 is disposed on an input side of the soft start system, circuit, or board 115. A forward direction feedback signal 210 is provided from the direction selection switch 120 to the soft start system 115. A reverse direction feedback signal 212 is provided from the direction selection switch 120 to the soft start system 115.

A variety of switches can be used in the present disclosure. Although the direction selection switches are described herein as mechanical, i.e., having physical components such as contacts, terminals, and/or throws or movable switching members; it will be understood that the present disclosure includes the use of electromechanical and electronic switches. The direction switches used in the present disclosure are multiposition switches and typically provide for selection of a first position, a second position, a third position, and in many versions a fourth position or additional positions. In many embodiments, the direction switches may provide two positions, three positions, or four or more positions. The switch positions typically correlate with operation modes of the motor, tool, or machine, such as for example forward, reverse, and neutral. A wide variety of momentary switches can be used.

Figure 8:
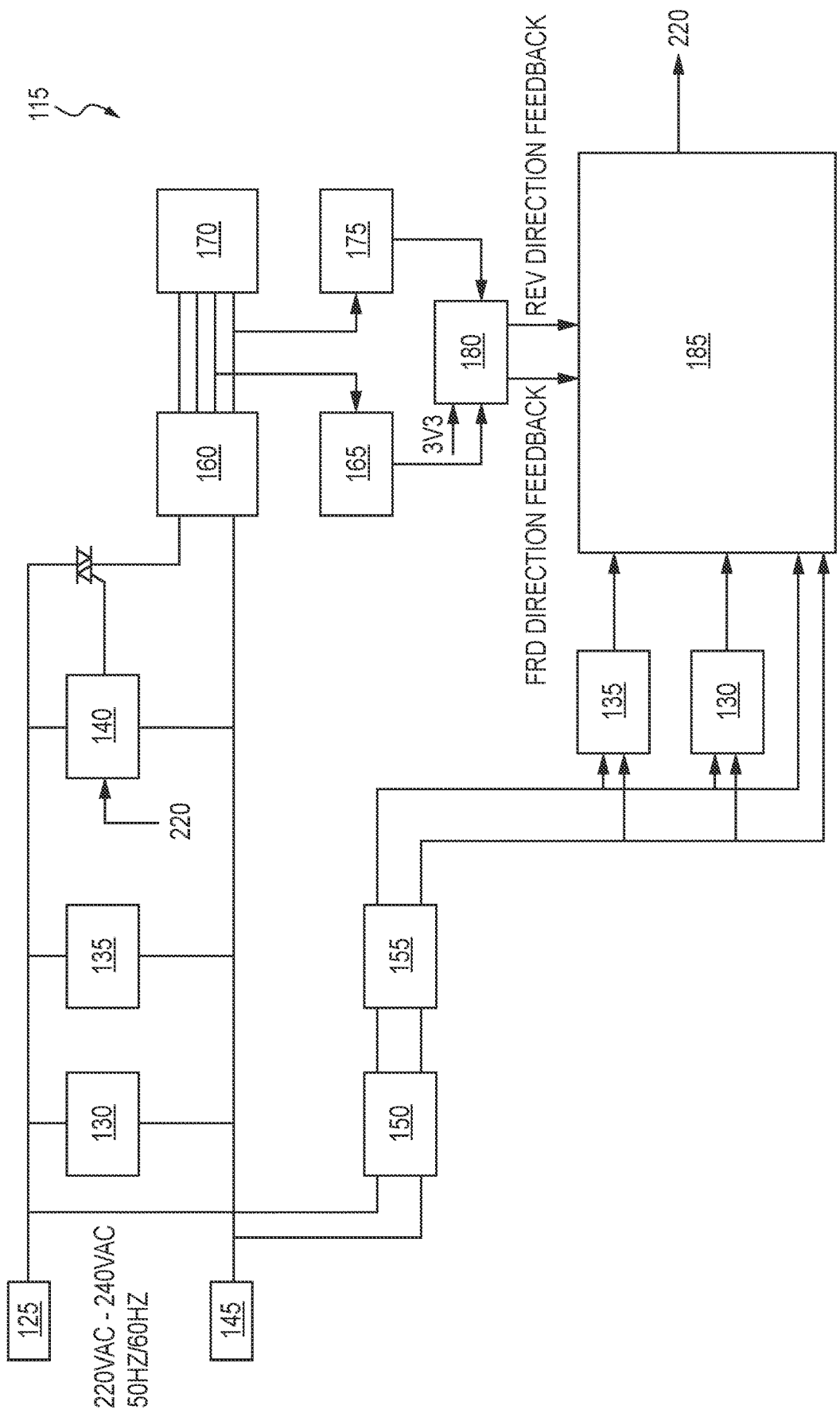
FIG. 8 illustrates a schematic block diagram of a soft start system, circuit, or board, in accordance with an embodiment of the present disclosure.

FIG. 8 shows a schematic block diagram of the soft start system, circuit, or board 115 in accordance with the present disclosure. Referring to FIG. 8, in one embodiment, when the momentary switch 105 (shown in FIG. 7) is pressed or otherwise actuated, AC mains voltage is available at the input of a non-isolated power supply 150. The non-isolated power supply 150 generates DC voltage and is applied at the input of an isolated DC-DC converter 155 to power up all digital circuit(s) of the system 115. Typically, the power supply 150 is an AC-DC transformer, and the converter 155 is a step-down converter that reduces DC voltage applied to its input, to a DC output voltage typically within a range of from 5 volts to 3.3 volts. The system 115 generally comprises a momentary/foot switch detection circuit or other provision 130, a zero crossing detection (ZCD) circuit or other provision 135, one or more TRIAC driver(s) 140, a forward direction detection circuit or provision 165, a reverse direction detection circuit or provision 175, a signal conditioning circuit or provision 180, and a microcontroller 185. In some versions, the soft start system 115 may further comprise the non-isolated power supply 150 and the isolated DC-DC converter 155. The soft start system 115 receives electrical power from an AC power source or line 125 and an associated neutral 145. The soft start system 115 is in electrical communication with an FRD/REV direction switch 160 (similar to or the same as the previously noted direction switch 120) which in turn is in electrical communication with a motor 170.

Figure 9:
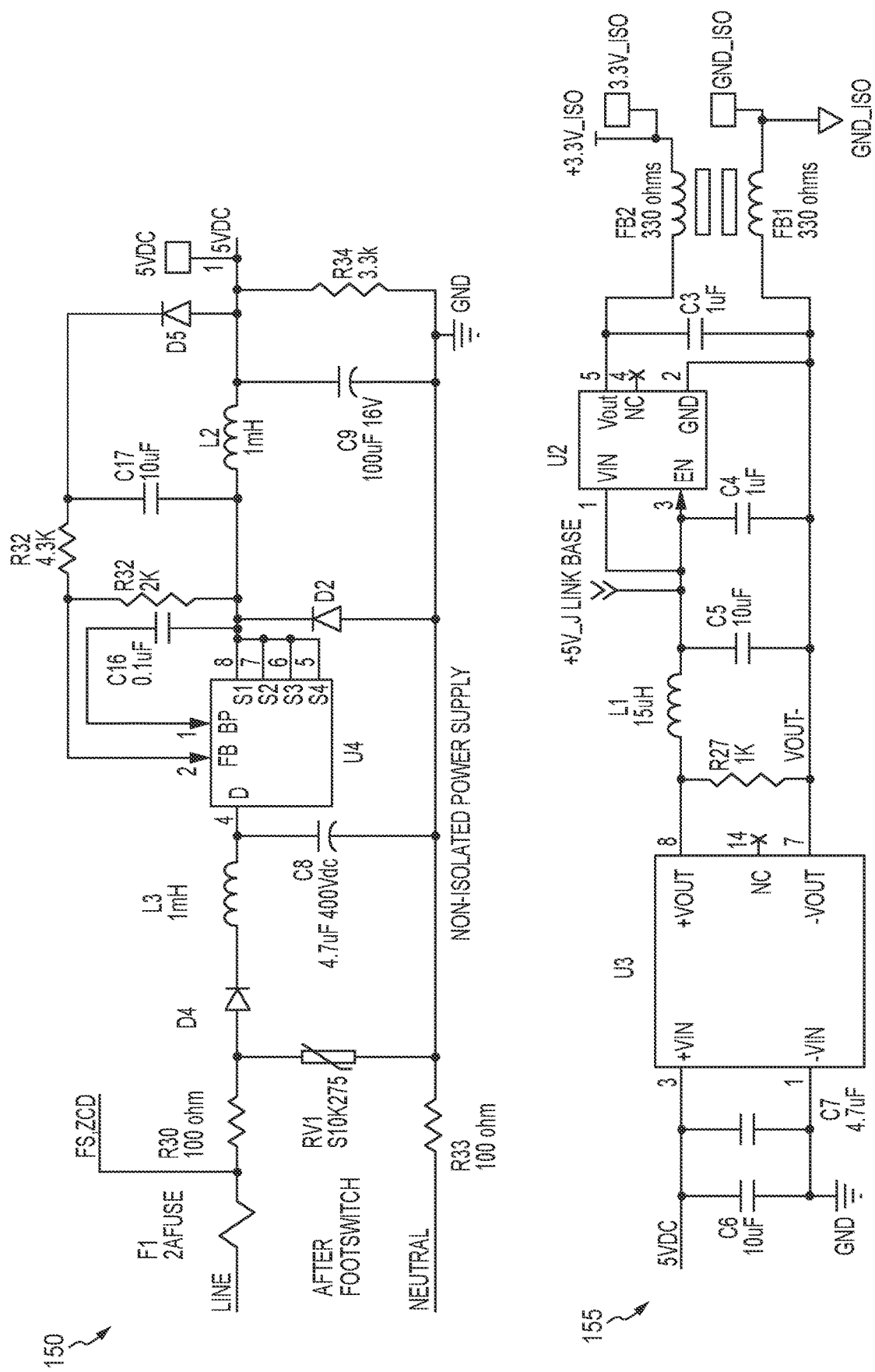
FIG. 9 illustrates a schematic diagram of a power supply and a converter used in association with the soft start circuit.

FIG. 9 shows schematic diagrams of a typical power supply 150 and converter 155 used in the soft start circuit 115. An on-board circuit detects pressing or actuation of the momentary switch 105 (FIG. 7) and provides a signal to the microcontroller 185 (FIG. 8). The soft start circuit or board 115 also detects the 'zero crossing' of the AC mains signal and generates one or more pulse(s) 220 (FIG. 8). These pulses 220 are fed back to the microcontroller 185 for identification of input signal frequency. The momentary switch detection 130 along with zero crossing detection (ZCD) 135 provides inputs to the microcontroller 185 to start or otherwise initiate a soft start routine or algorithm.

Figure 10:
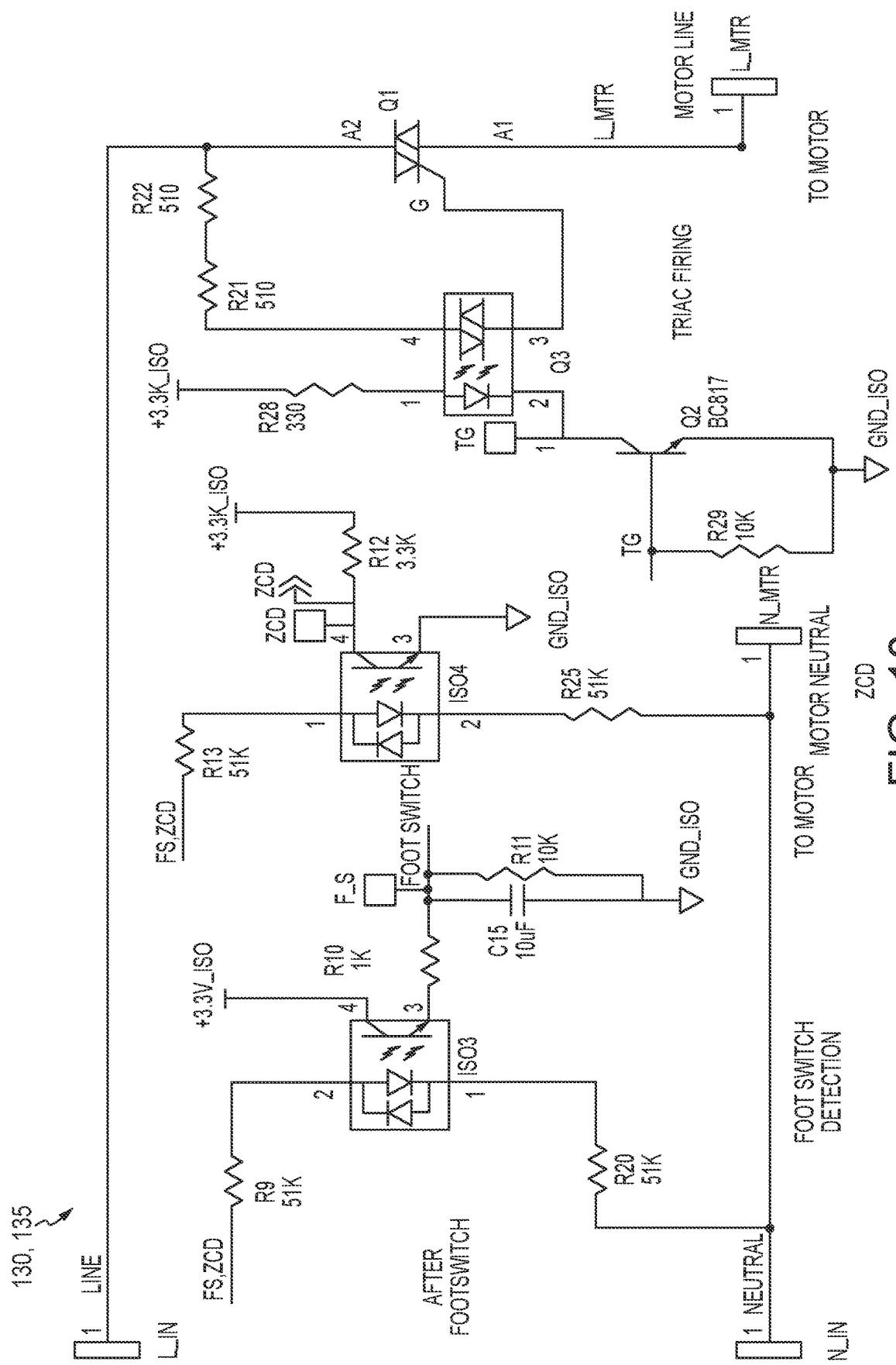
FIG. 10 illustrates a momentary switch detection circuit and a zero crossing detection circuit.

FIG. 10 shows a momentary switch detection 130 and a zero crossing detection (ZCD) circuit 135. The motor direction is detected based on armature voltage and hence to obtain feedback, there must be voltage present across the armature, and this is possible only if the mechanical direction selection switch 120 (FIG. 7) is either in the FRD position or the REV position. If the mechanical direction selection switch 120 is at another position such as a zero or "0" or OFF position, there will be no voltage across the armature and hence direction feedback will not be available. With standard operating conditions, when a user positions the mechanical direction selection switch 120 to the ON position and then presses the momentary switch 105, the soft start routine is initiated or otherwise applied and the motor turns ON gradually.

Figure 11:
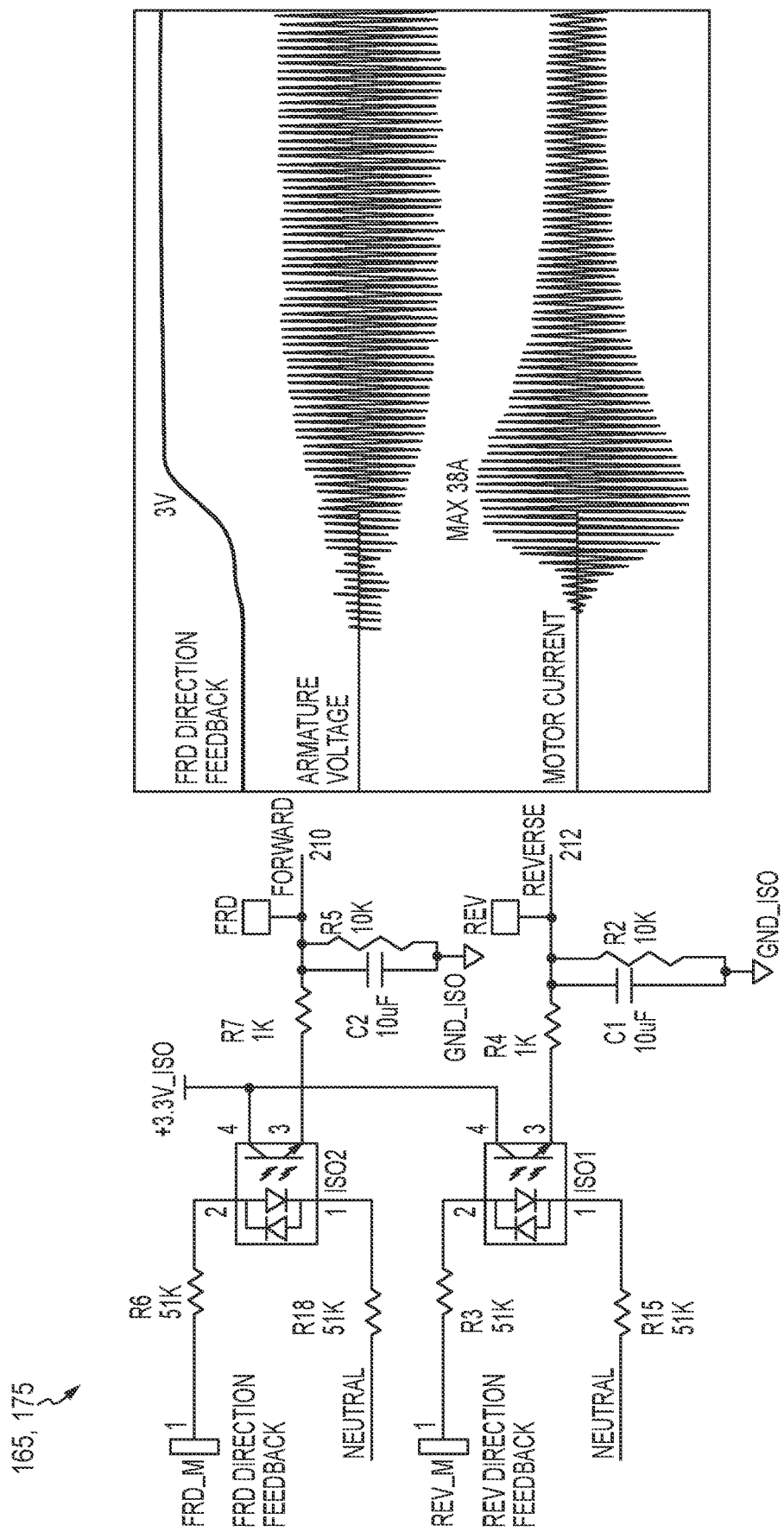
FIG. 11 illustrates a direction detection circuit and associated waveforms.
Figure 12:
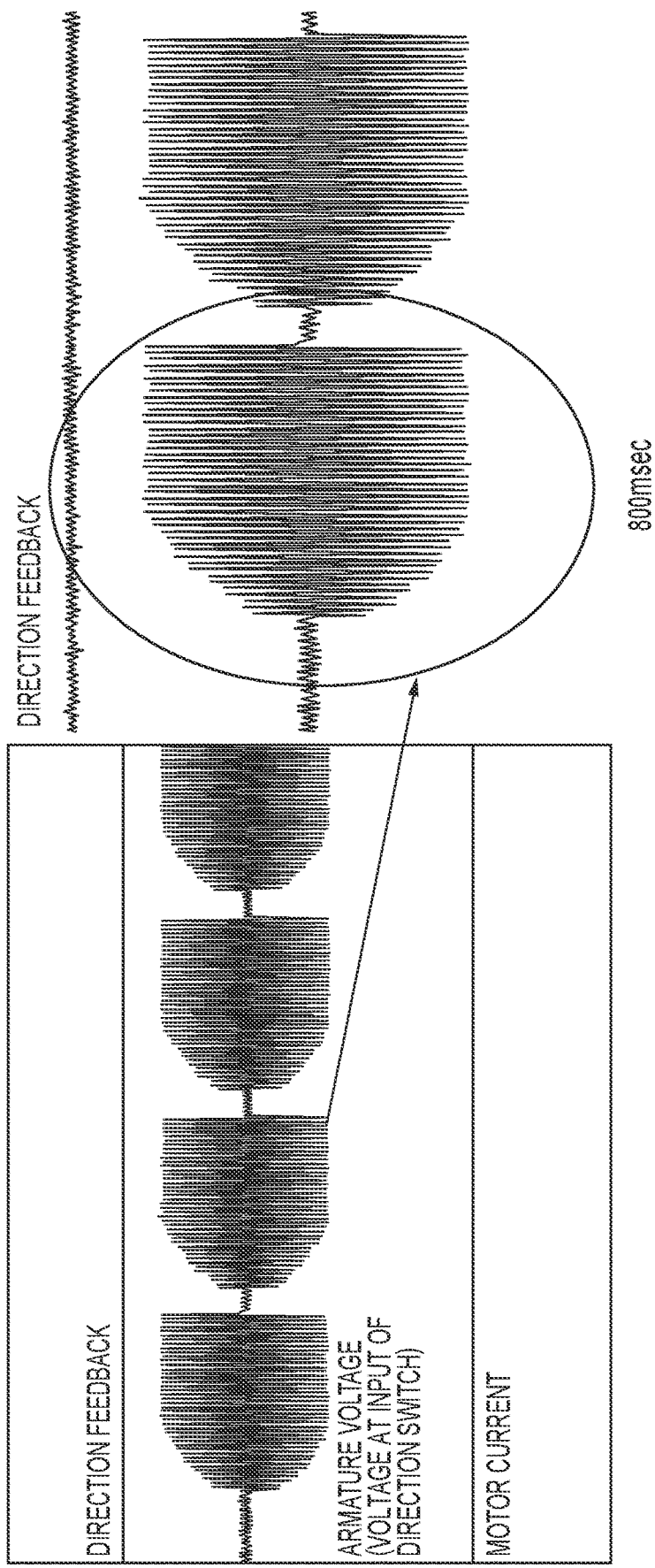
FIG. 12 illustrates a waveform condition in which a microcontroller reiterates a soft start routine or algorithm.

FIG. 11 illustrates direction detection circuits 165, 175 and associated waveforms. It can be seen from FIG. 11, that the direction feedback gradually increases as the armature voltage increases. It takes approximately 280 msec for the direction detection circuits 165, 175 to provide the noted feedback to the microcontroller 185. In a case in which the user has blocked the momentary switch 105 but the mechanical direction selection switch 120 is at the 0 position, the on-board microcontroller 185 will receive a signal from the momentary switch 105 and the zero crossing detector (ZCD) 135, and hence the controller 185 will initiate the soft start routine. But since the mechanical direction selection switch 120 is at the 0 position, there will not be any voltage across the armature and thus no direction feedback will be present and hence the soft start routine will be halted and the microcontroller 185 will re-initiate the routine as shown in FIG. 12. This results in a loop or re-iteration of the soft start routine or algorithm. Since the on-board controller 185 has no control over the time at which the user will turn on the direction switch 120, this situation may result into an unwanted HOT start condition as shown in the waveforms of FIG. 13.

More specifically and in certain embodiments, the forward direction and the reverse direction are monitored using voltage measurement on the rotary switches. This measurement (as shown in FIG. 11) is used to identify, if the switch selection is a forward direction or a reverse direction by measuring the voltage at terminals across the armature winding. The circuit gives sluggish performance and if the user has blocked the momentary switch 105 (not a recommended operation but which can occur in the field), this may result in loss of soft start functionality. To avoid this loss of soft start functionality, the circuit of FIG. 14 is utilized.

Figure 13:
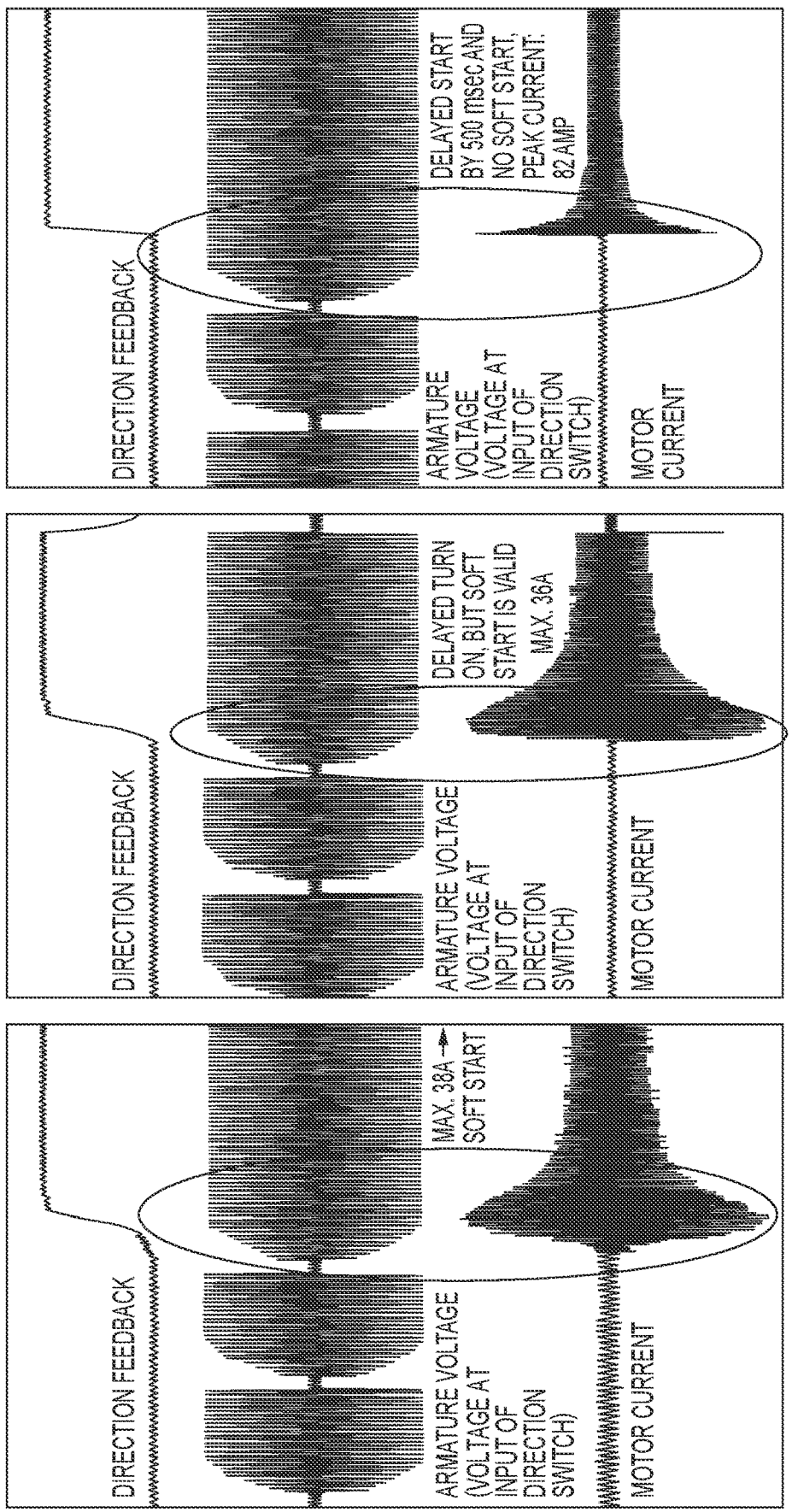
FIG. 13 illustrates waveforms associated with an undesirable HOT start condition.

FIG. 13 shows different time instances at which a user can turn ON the direction switch 120 to either a FRD/REV position and based on motor voltage at that instant, equivalent current is fetched by the motor 170. This results in a HOT start. Therefore, to remedy this condition, in accordance with the present subject matter, it was deemed necessary to improve the response time of direction feedback and to apply a constant voltage to the motor armature. This was discovered to avoid both sluggish behavior and sudden activation or "jerk" of the motor 170.

Figure 14:
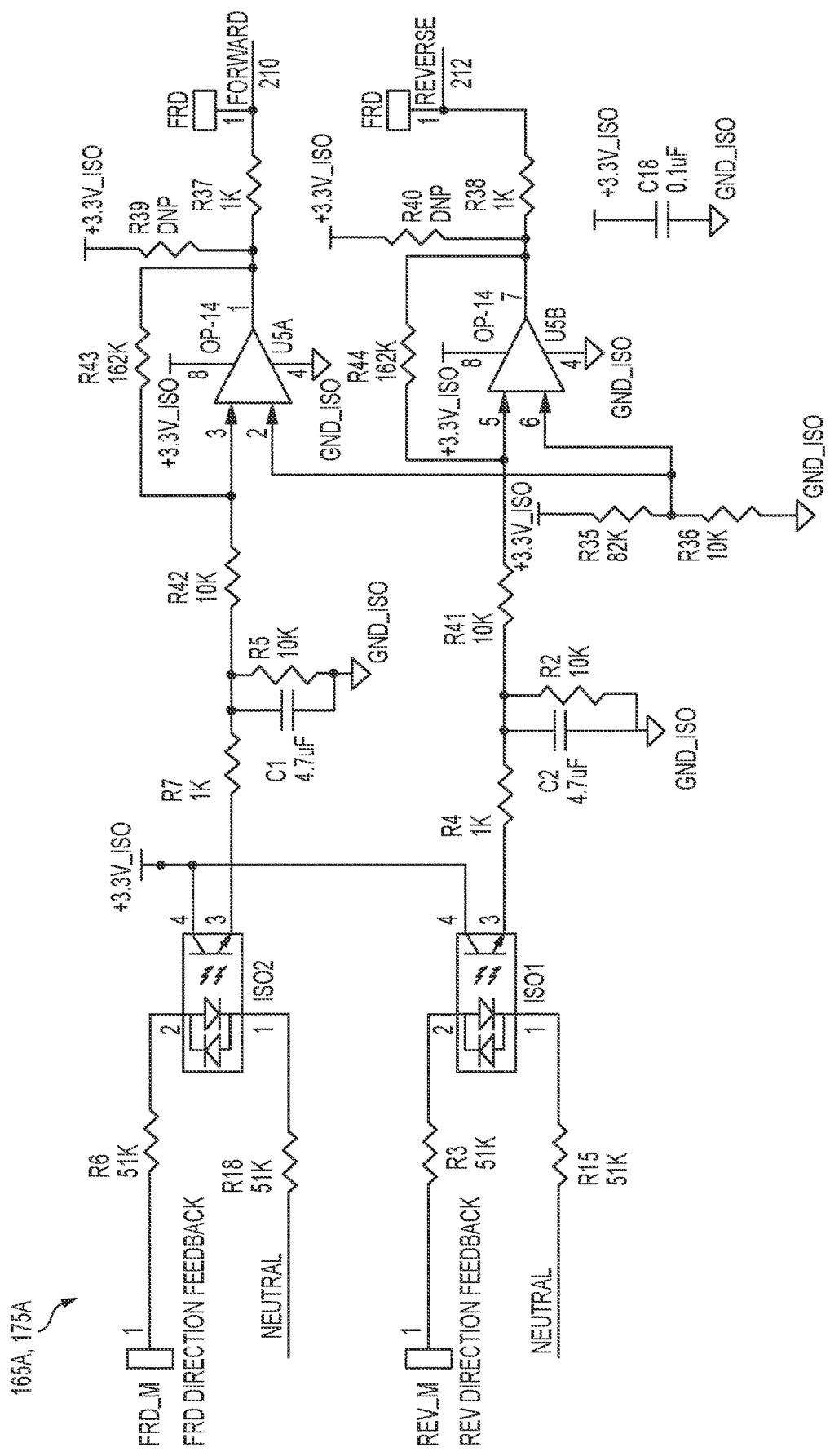
FIG. 14 illustrates a modified direction feedback circuit.

FIG. 14 shows modified direction feedback circuits 165A, 175A in accordance with the present disclosure. The direction feedback output 210, 212 is provided to the on-board microcontroller 185, and based on this feedback and several other feedbacks, signals the microcontroller 185 to execute the soft start functionality. The circuit of FIG. 14 ensures the timing of the circuit is fast enough to avoid a HOT start. ISO1/ISO2 provide isolation from AC mains voltage which is present on the mechanical direction switch/ armature winding. Further, IS01/IS02 convert AC mains supply to low level DC voltage (such as from 0 to 3VDC) which is then processed by additional signal conditioning circuit(s) (180 in FIG. 8) before providing the low level voltage to the microcontroller 185. The circuit of FIG. 14 allows early detection of direction, i.e., detecting direction at low motor current. The circuitry includes an operational amplifier which detects the direction of the rotary switch, i.e., the direction switch, at very low armature voltage levels and hence low armature current, and communicates this to the microcontroller 185. The circuit allows AC voltage to appear across the rotary switch, for a very small amount of time, such as a fixed duty cycle, which will not result in "jerk" to the motor 170 or sluggish behavior of the motor 170. When the user changes the rotary switch to either the FRD or REV position, this AC voltage is applied to the armature winding of the motor 170. The circuit of FIG. 14 senses this low voltage and a signal is given to the on-board microcontroller 185 within 100 msec to execute a soft start routine, which is not detectable by user. This operation makes the entire circuit unique and particularly when operated with a threading machine having the noted momentary switch 105 and the mechanical direction switch 120.

Figure 15:
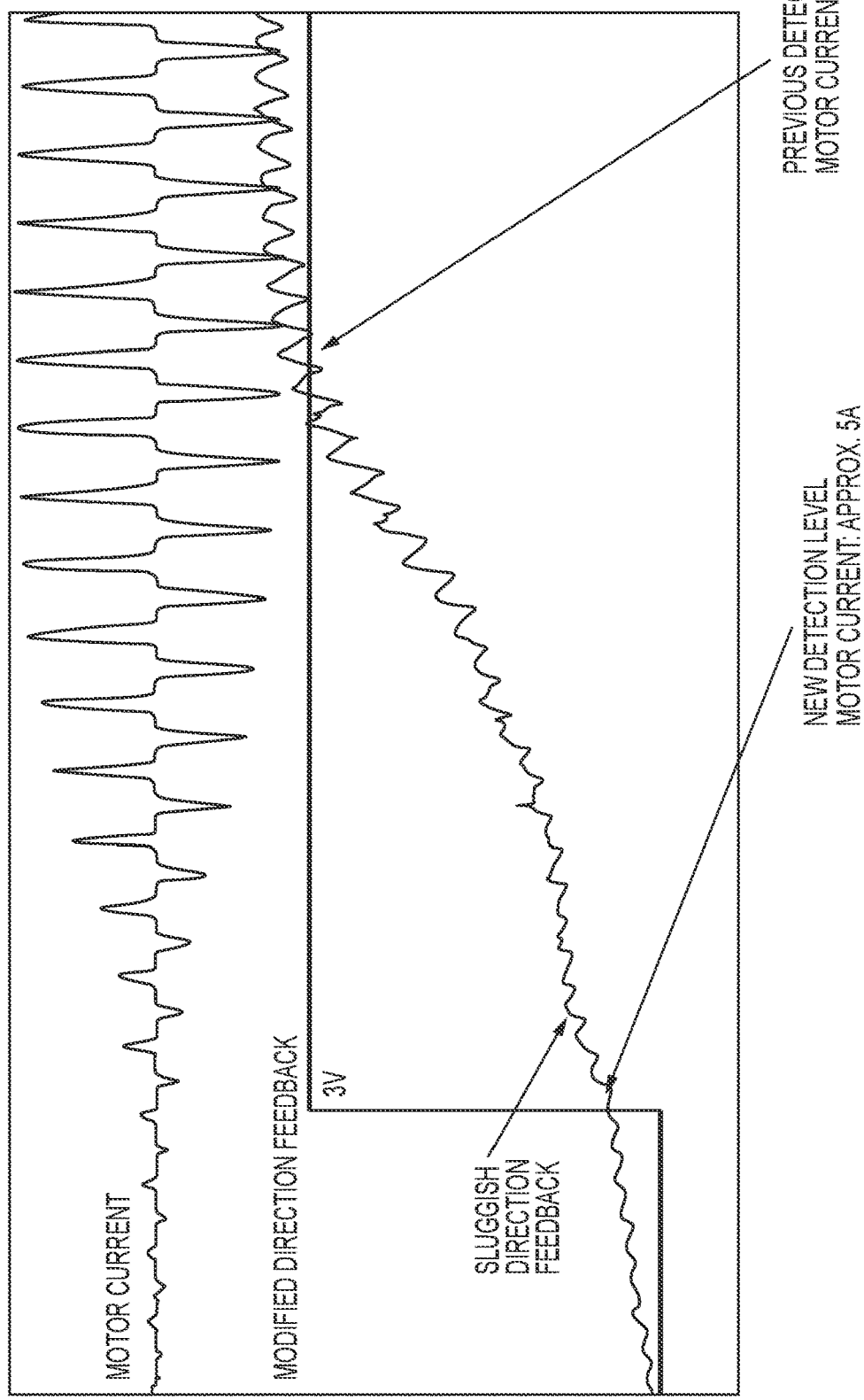
FIG. 15 illustrates a waveform of a modified direction detection.
Figure 16:
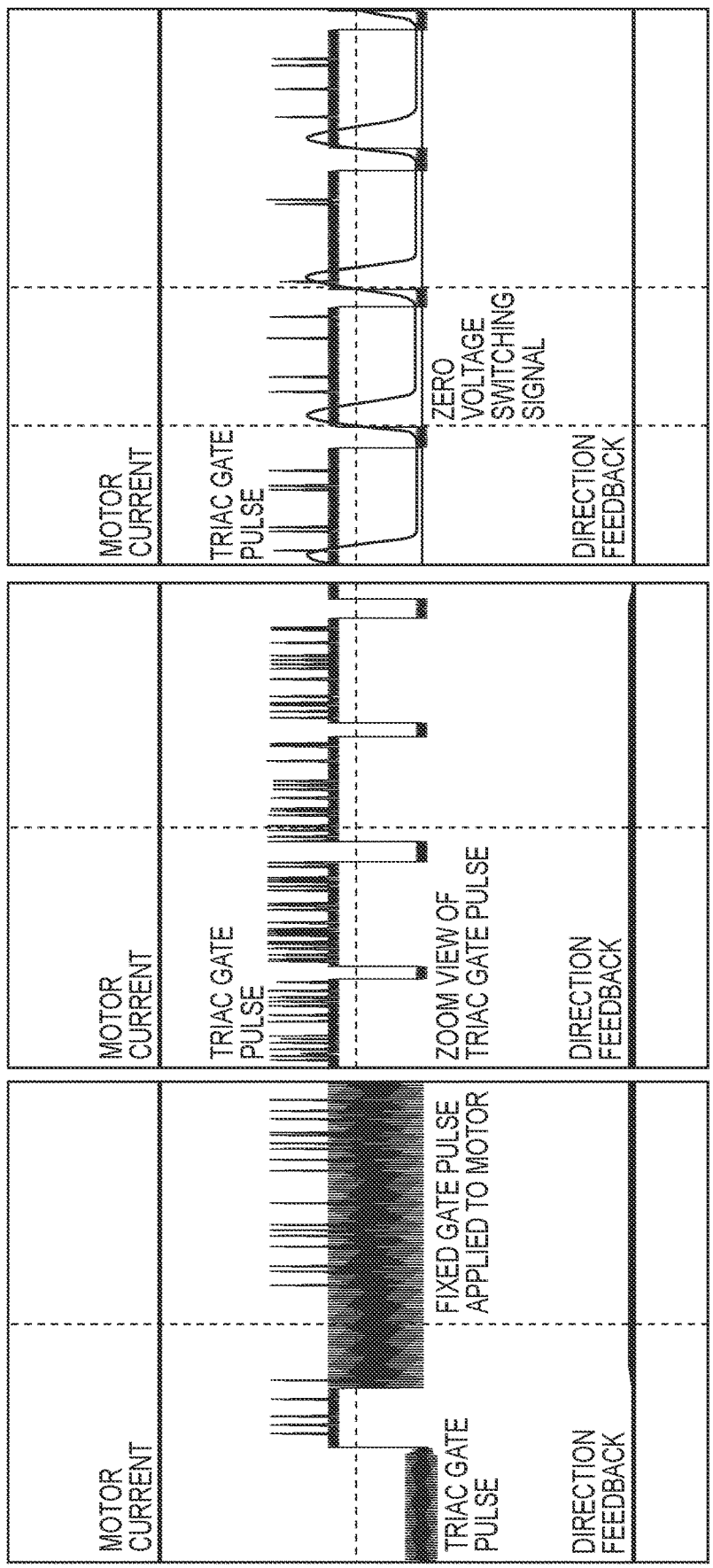
FIG. 16 illustrates a waveform of a TRIAC gate pulse.
Figure 17:
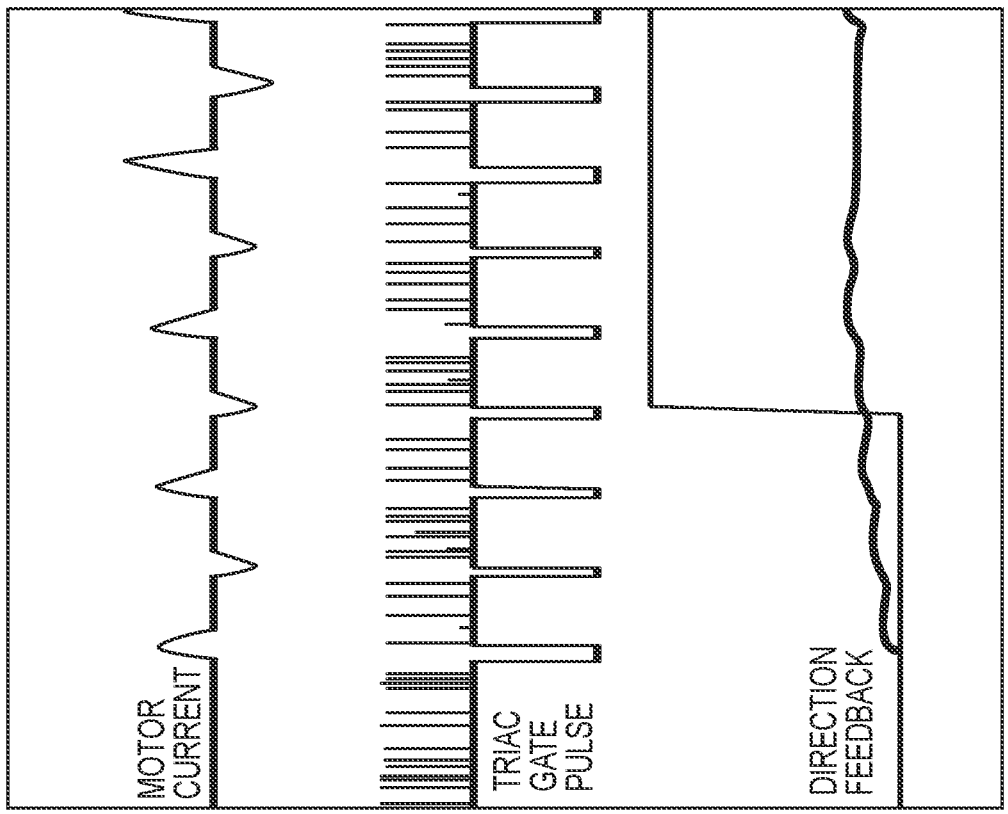
FIG. 17 illustrates waveforms with a modified direction feedback.
Figure 17:
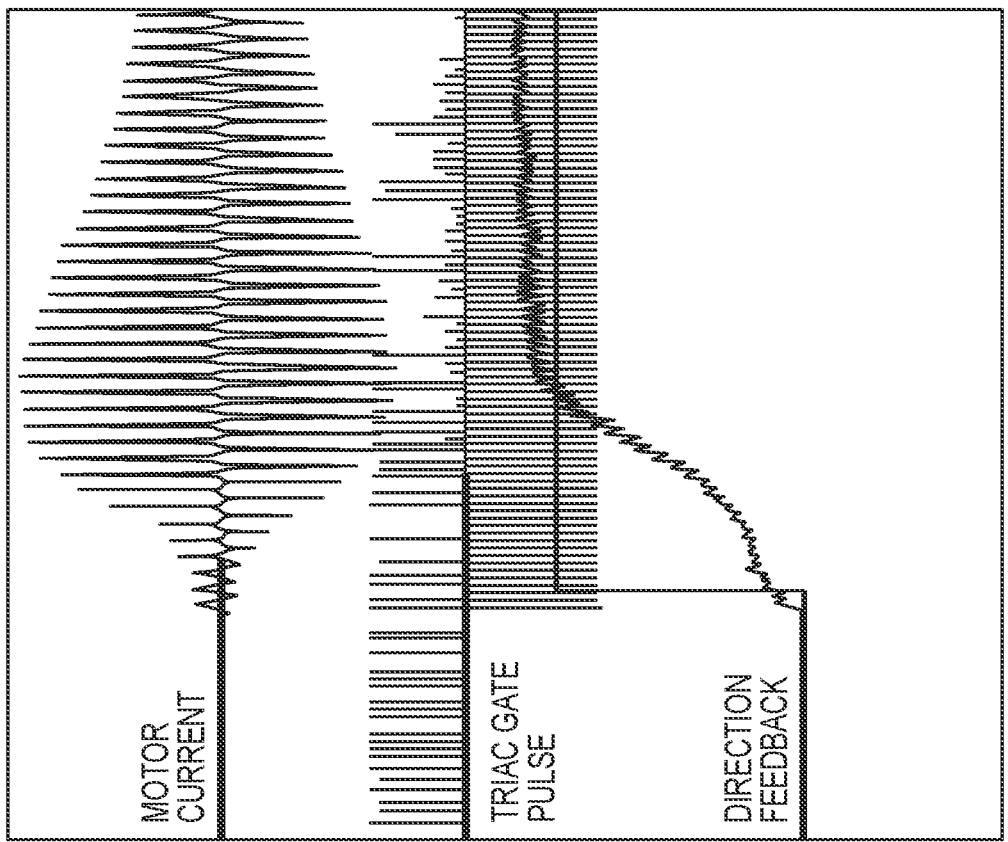

FIG. 15 shows a waveform of a modified direction detection. With this reduced detection level, it is now not necessary to provide a complete soft start routine for direction detection. An optimum TRIAC duty cycle is identified, which avoids the noted sluggish behavior and/or the noted motor jerk, and this duty cycle can be applied continuously to the motor 170 irrespective of the mechanical direction selection switch position. This TRIAC gate pulse is sinked with a zero crossing detection signal as shown in the waveform depicted in FIG. 16. Waveforms with modified direction feedback can be seen in FIG. 17.

Figure 18:
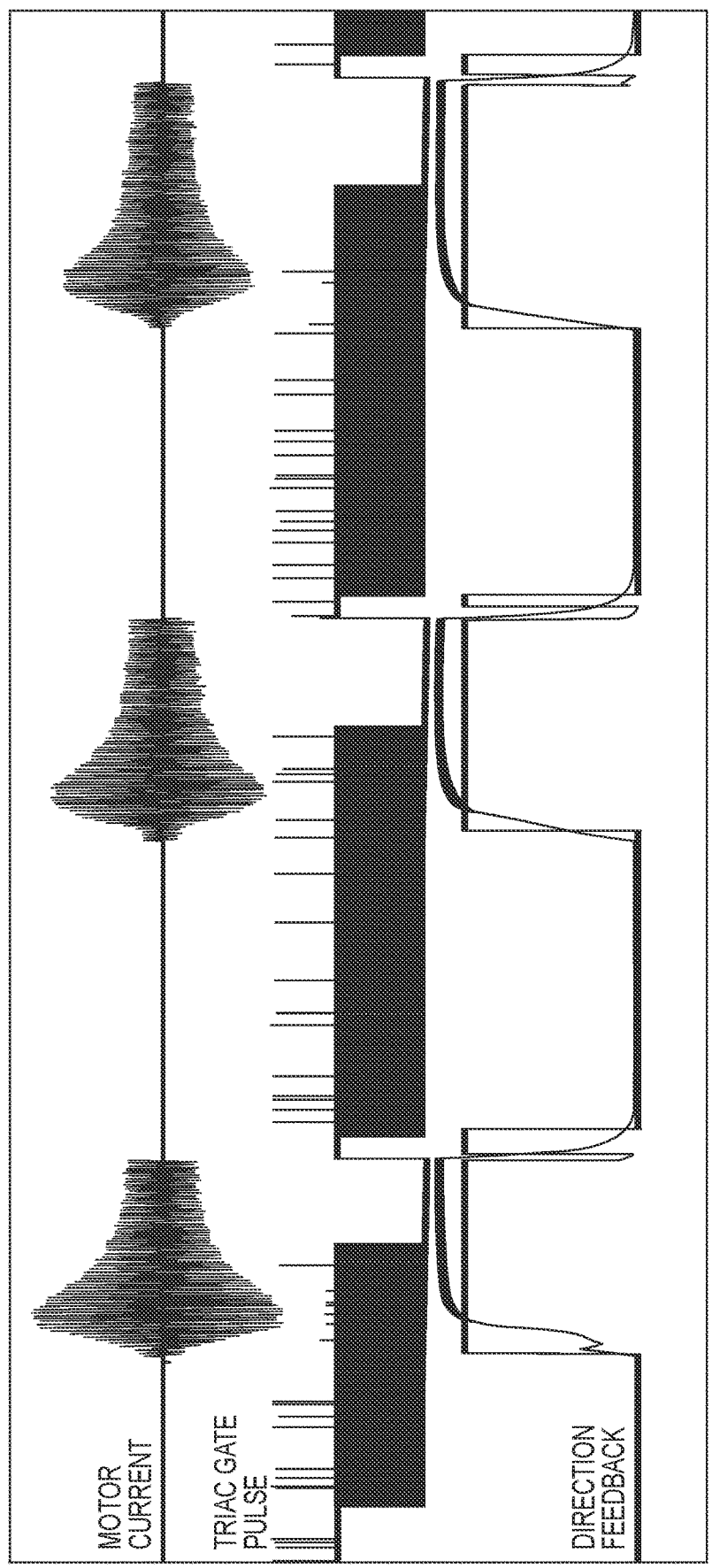
FIG. 18 illustrates waveforms of a soft start.

Waveforms were evaluated with the momentary switch 105 blocked and mechanical direction selection switch 120 is turned ON/OFF. As shown in the waveform of FIG. 18, a soft start is observed at every turn ON irrespective of the machine misuse.

In many embodiments, the present disclosure aims for presence of direction detection, and provides a soft start without a current sensor. As a result, the reliability, cost and size reduction of the resulting system is improved as voltage sensors typically last longer than current sensors.

Further, the present disclosure provides a solution for threading machines which have a momentary switch such as switch 105 and direction switch such as switch 120, and can be used for threading machines, and particularly for those with a power range of from 0.5HP to 3HP. It will be understood that the present disclosure can also be used with power tools having a power range less than 0.5HP and/or greater than 3HP.

Figure 19:
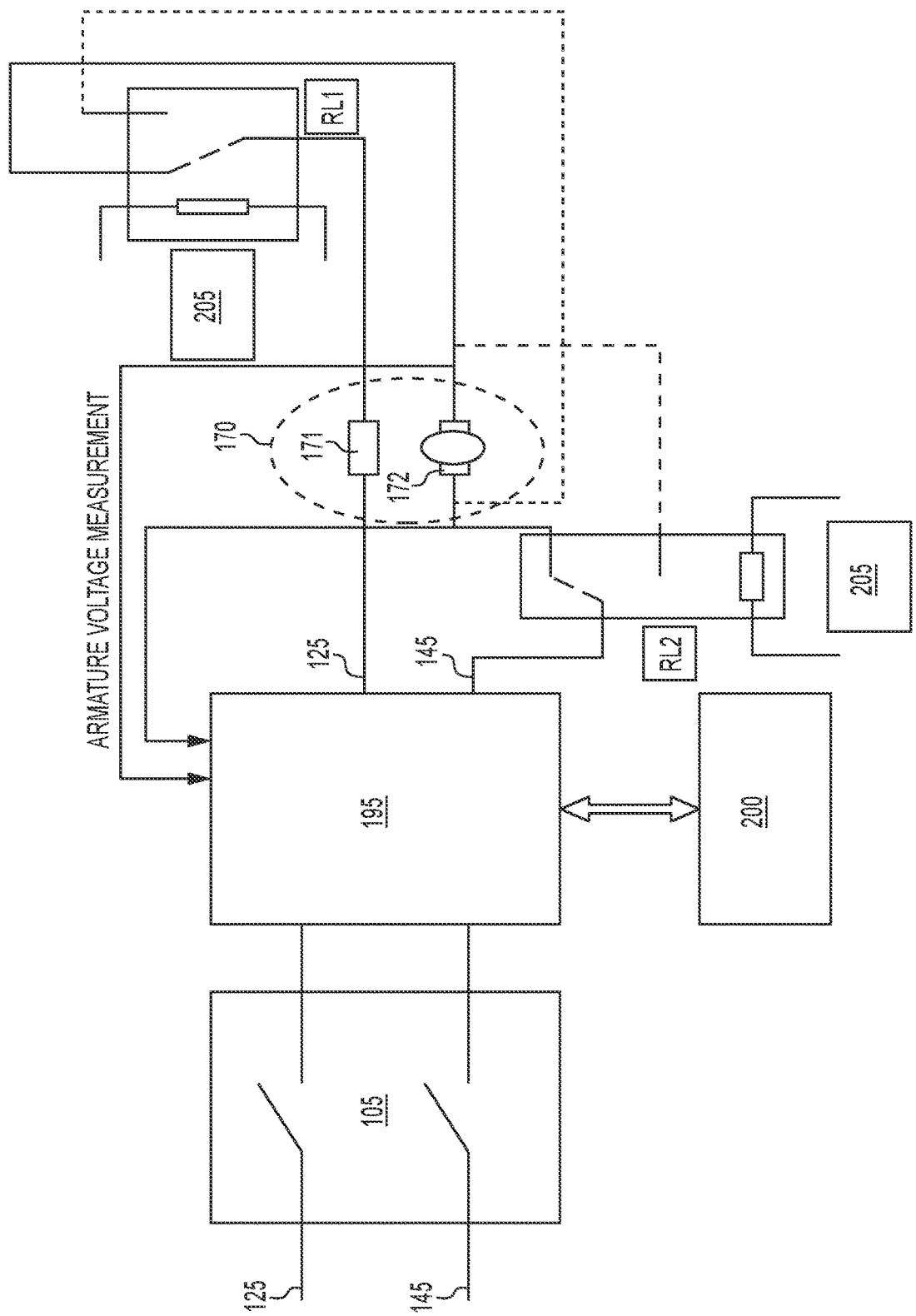
FIG. 19 illustrates an alternative embodiment of a power tool system in which a soft start is utilized but the direction of motor rotation is changed electronically.

In an alternative embodiment, a similar solution can be implemented for power tools in which a soft start is essential but the direction of rotation is changed electronically, i.e., a mechanical switch is absent, for example, by pressing an on board button or other component. The system can be realized using a combination of relays which can be used to change the direction of current flowing through the armature of the motor based on electronic signal(s) received. FIG. 19 shows a schematic system block diagram for this configuration. Relays can be mounted externally on a panel or can be mounted on an electronic control board incorporated in the power tool for example. Specifically, FIG. 19 illustrates another embodiment of a circuit for a power tool using a soft start system in which the direction of motor rotation is changed electronically. An AC power source or line 125 and an associated neutral 145 are provided at the momentary switch 105. The output of the switch 105 is in electrical communication with an electronic control board 195. The electronic control board 195 typically includes a microcontroller and other circuitry as described herein. The electronic control board 195 receives an actuation signal from a push button, toggle, or rocket switch 200. The AC power source and neutral 125, 145 provide electrical power to the motor 170. Two relays RL1 and RL2, each with a coil 205, are in electrical communication with the field winding and the armature winding 172, respectively. The electronic control board 195 receives armature voltage measurement signals which are used by the electronic control board 195 to determine direction of rotation of the motor 170. The relays RL1 and RL2 and associated coils 205 can be energized, such as by the electronic control board 195 to change the direction of current flowing through the armature winding 172 of the motor 170, based on the armature voltage measurement signals or other parameter(s).

The soft start system and related aspects of the present disclosure can be incorporated and/or used with a wide array of power tools, such as the power tool 250 schematically shown in FIG. 7. Nearly any power tool using an electric motor, a momentary switch, and a direction switch can be used in conjunction with the present disclosure. Non-limiting examples of such power tools include threading machines, drain cleaners, hand drills, impact wrenches, lathes, and the like.

Generally, in one embodiment the power tools comprise an electric motor providing a rotary output, a momentary switch for switching an electrical power source to the motor, a direction selection switch for switching the motor rotation direction to the motor, and a soft start system for controlling operation of the electric motor. In certain versions, the power tool may include a suppressor disposed on an input side of the soft start system. The power tool may include at least one direction feedback signal from the direction selection switch or other circuitry to the soft start system. The power tool may include a forward direction signal from the direction selection switch or other circuitry to the soft start system. Alternatively or in addition, the power tool may include a reverse direction signal from the direction selection switch or other circuitry to the soft start system. The soft start system can include (i) a zero crossing detection provision for providing a zero crossing detection signal, (ii) a driver for switching and controlling the electrical power source, the driver having an input for receiving a driver control signal, and (iii) a microcontroller for performing a soft start algorithm. The momentary switch or other circuitry provides a momentary switch actuation signal. The direction selection switch or circuitry provides a forward direction signal and a reverse direction signal. The microcontroller receives the momentary switch actuation signal, the zero crossing detection signal, the forward direction signal, and the reverse direction signal. The microcontroller is configured to generate a driver control signal using the soft start algorithm. The driver control signal is provided to the input of the driver. In certain versions, the direction selection switch is a mechanical direction selection switch. And, in other versions, the direction selection switch is an electronic direction selection switch.

In another embodiment, the power tools comprise an electric motor providing a rotary output, and a soft start system for controlling operation of the electric motor. The soft start system includes (i) a momentary switch for switching an electrical power source, the momentary switch or other circuitry providing a momentary switch actuation signal, (ii) a zero crossing detection provision for providing a zero crossing detection signal, (iii) a driver for switching and controlling the electrical power source, the driver having an input for receiving a driver control signal, (iv) a direction selection switch for switching the motor rotation direction, the direction selection switch or other circuitry providing a forward direction signal and a reverse direction signal, and (v) a microcontroller for performing a soft start algorithm. The microcontroller receives the momentary switch actuation signal, the zero crossing detection signal, the forward direction signal, and the reverse direction signal. The microcontroller is configured to generate a driver control signal using the soft start algorithm. The driver control signal is provided to the input of the driver. In certain versions, the soft start system is free of a current sensor. The direction selection switch may be a mechanical direction selection switch. Alternatively, the direction selection switch may be an electronic direction selection switch.

Figure 20:
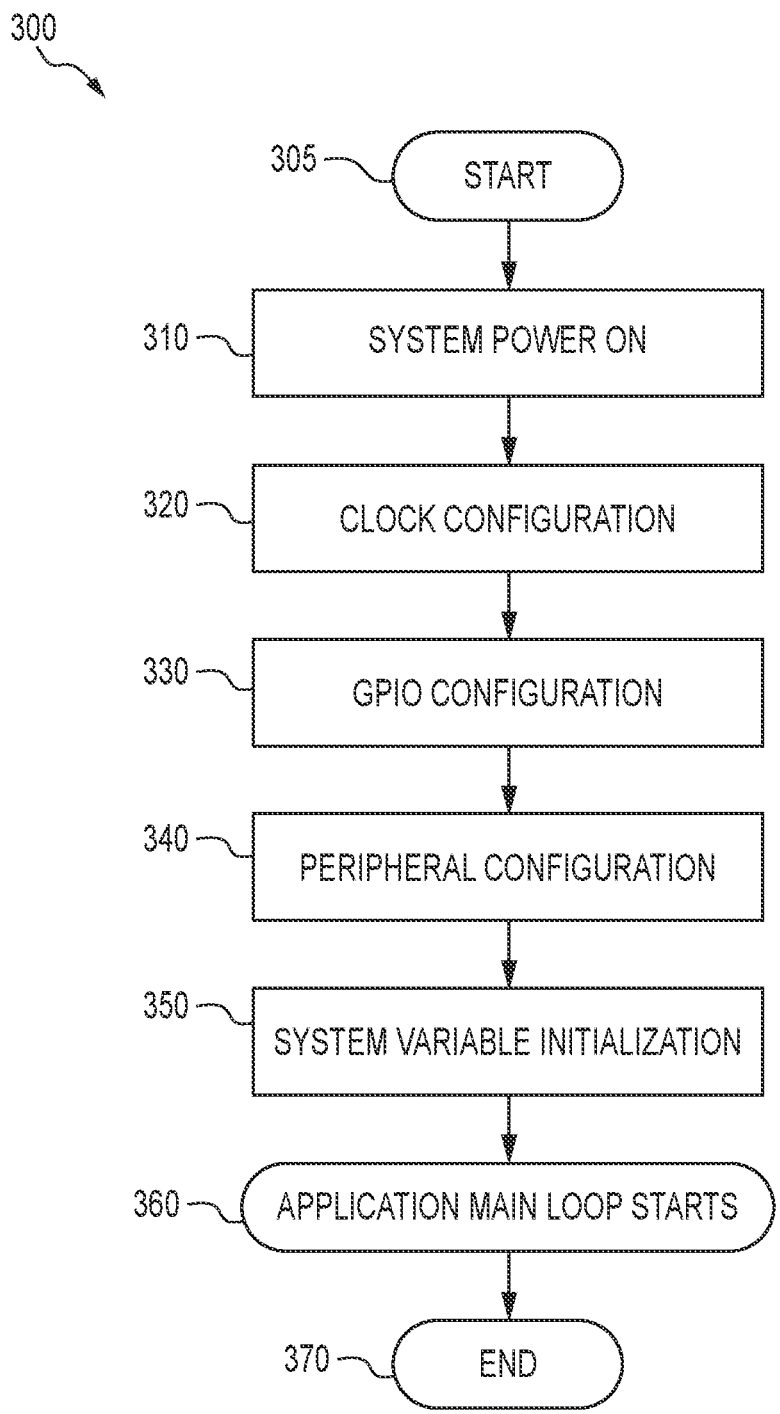
FIG. 20 is a flowchart illustrating a method for powering up a tool in accordance with the present subject matter.

FIG. 20 illustrates a method 300 for powering up a tool or tool system in accordance with the present subject matter. The method 300 comprises actuation of a power switch or start routine associated with the tool or tool system, shown as operation 305. In operation 310, system power is on which may be indicated to a user via indicators or lights for example. In operation 320, clock(s) and/or controller(s) in the tool system are initiated, which may in some applications include resetting. In operation 330, general purpose input/output (GPIO) controls associated with the tool or tool system are initiated and/or otherwise configured. For example, this may include configuring the controller pins as input or output depending on the type of circuit to which they are connected. GPIO Pin can be configured to input for detecting the direction feedback, also GPIO can be configured to output to generate gate pulses to turn on TRIAC. In operation 340, peripheral components are configured. For example, this may include configuration of timer inside micro controller required to do timing calculations and configuration of micro controller pins as a communication channel such as UART or I2C. In operation 350, system variables are initialized. For example this may include initialization of some of the default variables such as Zero Crossing Detection debounce delay and default input frequency and Fixed gate Pulse width which needs to be applied to TRIAC before direction feedback is received. In operation 360, an application main loop begins. That is described in association with FIG. 21.

In operation 370, the method 300 is terminated. Termination may result from operator action and/or from other operational aspects.

Figure 21:
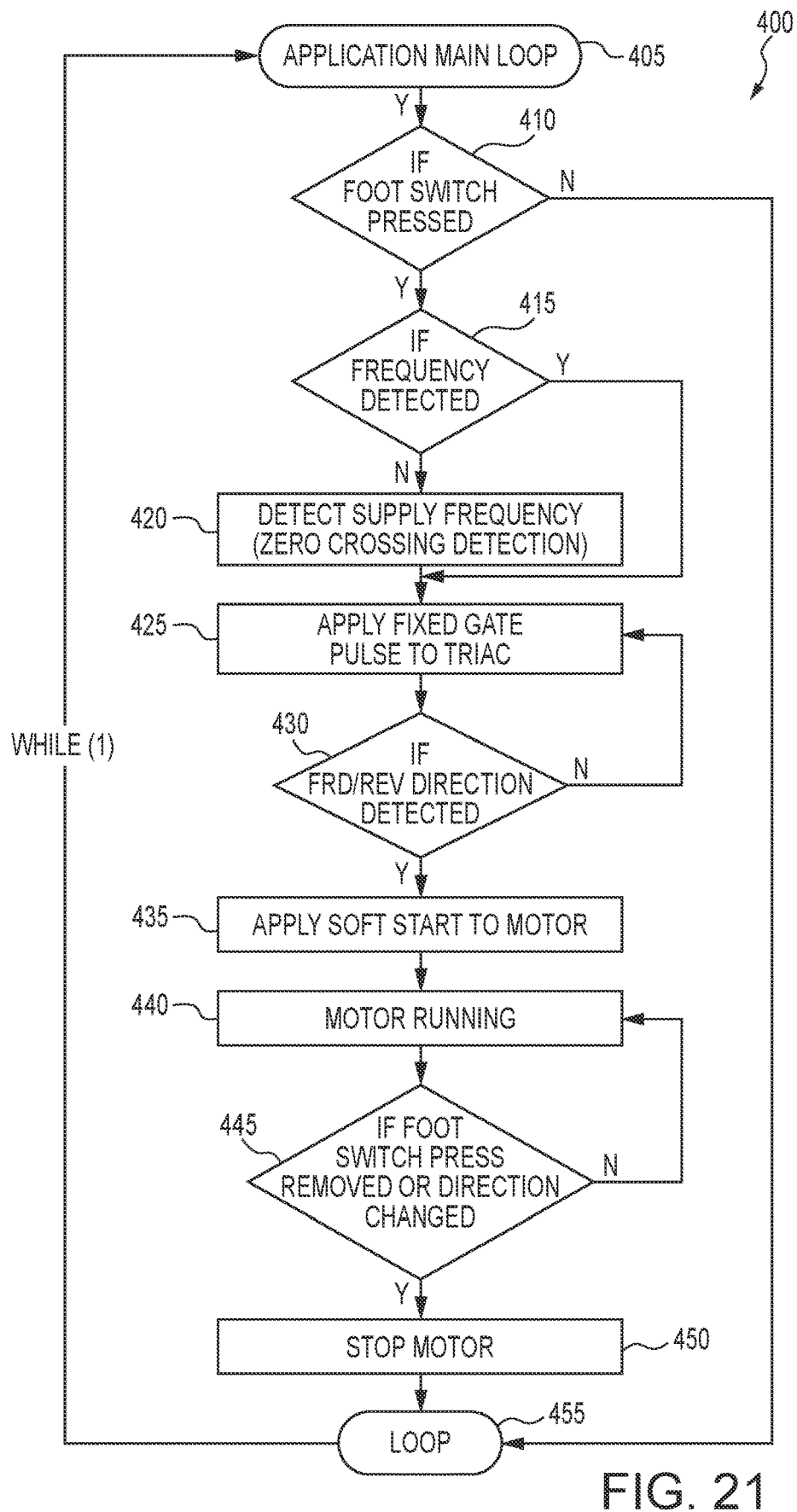
FIG. 21 is a flowchart illustrating a method of operation of a tool in accordance with the present subject matter.

FIG. 21 illustrates a method 400 for performing an application main loop associated with the tool or tool system, such as the main loop referenced in FIG. 20. The method 400 includes an initial permission stage shown as 405. If allowed, a state of a switch such as a foot switch 410 is assessed in operation 410. If the switch in operation 410 is actuated, the method proceeds to an operation 415 in which frequency is detected. If the switch in operation 410 is not actuated, the method proceeds to loop stage 455, described herein. In operation 415, if frequency is detected, the method proceeds to a stage immediately prior to operation 425, described herein. In operation 415, if frequency is not detected, an operation 420 is performed in which supply frequency is detected, referred to as zero crossing detection. In operation 425, a fixed gate pulse is applied to one or more TRIAC(s). In operation 430, if a forward or reverse direction is detected, the method proceeds to operation 435, described herein. In operation 430, if a forward or reverse direction is not detected, the method performs operation 425 again. In operation 435, a soft start is applied to the motor. At stage 440 the motor is operating. In operation 445, if the foot switch or other actuator is de-actuated, or if the direction is changed, the motor is stopped in operation 450. If the foot switch or other actuator is unchanged and if the direction remains unchanged, the motor continues to operate as in 440. Upon stopping the motor in operation 450, the method reaches loop stage 455 at which the method is repeated beginning at 405.

The present disclosure described herein provides several technical advantages including, but not limited to, the realization of a soft start for a power tool with a momentary switch and a mechanical direction selection switch. As noted, in certain versions the power tool may use an electronic direction selection switch. These advantages include but are not limited to facilitating the presence of direction detection, facilitating a soft start without the need for a current sensor, providing a common solution for threading machines which includes momentary switch and direction switch, and/or enabling use for threading machines operating in a power range of 0.5HP to 3HP.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well known processes, well known apparatus structures, and well known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, elements, modules, units and/or components, but do not forbid the presence or addition of one or more other features, elements, components, and/or groups thereof.

When an element is referred to as being "mounted on," "engaged to," "connected to," or "coupled to" another element, it may be directly on, engaged, connected or coupled to the other element. As used herein, the term "and/or" includes any and all combinations of one or more of the associated listed elements.

Terms such as "inner," "outer," "beneath," "below," "lower," "above," "upper," and the like, may be used in the present disclosure to describe relationships between different elements as depicted from the figures.

The use of the expression "at least" or "at least one" suggests the use of one or more elements or ingredients or quantities, as the use may be in the embodiment of the disclosure to achieve one or more of the desired objects or results.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An electrical power circuit for use with a universal motor, the power circuit comprising:
    a momentary switch;
    a direction selection switch;
    a soft start system;
    at least one direction feedback signal from the direction selection switch to the soft start system;
    wherein the direction selection switch includes a first state for a reverse direction of the universal motor, a second state for no rotation of the universal motor, and a third state for a forward direction of the universal motor;
    wherein the direction selection switch is configured to change the direction of rotation of the universal motor, the momentary switch includes a first state for actuation and a second state for de-actuation; and
    wherein the direction selection switch and the momentary switch are configured such that if the momentary switch is in the first state for actuation, and the direction selection switch is in the third state for the forward direction of the universal motor, the universal motor operates in a forward direction.

2. The electrical power circuit of claim 1 wherein the at least one direction feedback signal includes a reverse direction signal from the direction selection switch to the soft start system.

3. The electrical power circuit of claim 1 wherein the soft start system includes (i) a zero crossing detection provision providing a zero crossing detection signal, (ii) a driver for switching and controlling an electrical power source, the driver having an input for receiving a driver control signal, and (iii) a microcontroller for performing a soft start algorithm;
    wherein the momentary switch provides a momentary switch actuation signal;
    wherein the direction selection switch provides a forward direction signal and a reverse direction signal;
    wherein the microcontroller receives the momentary switch actuation signal, the zero crossing detection signal, the forward direction signal, and the reverse direction signal, the microcontroller configured to generate a driver control signal using the soft start algorithm, the driver control signal provided to the input of the driver.

4. The electrical power circuit of claim 3 wherein the driver is a TRIAC driver.

5. The electrical power circuit of claim 3 wherein the soft start system is free of a current sensor.

6. The electrical power circuit of claim 1 wherein the direction selection switch is a mechanical direction selection switch.

7. The electrical power circuit of claim 1 wherein the at least one direction feedback signal is provided by a direction detection circuit.

8. The electrical power circuit of claim 7 wherein the direction detection circuit includes a forward direction detection circuit and a reverse direction detection circuit.

9. The electrical power circuit of claim 8 wherein the forward direction detection circuit and the reverse direction detection circuit detect a direction of rotation of the universal motor.

10. The electrical power circuit of claim 1 wherein the direction selection switch directly controls a direction of rotation of the universal motor.

11. The electrical power circuit of claim 1 wherein the direction selection switch is free from direct communication with a microcontroller configured to generate a driver control signal.

12. The electrical power circuit of claim 1 wherein the soft start system detects a direction of rotation of the universal motor.

13. The electrical power circuit of claim 1 wherein the electrical power circuit is configured such that upon actuation of the momentary switch, and upon a change in state of the direction selection switch, the soft start system is initiated.

14. The electrical power circuit of claim 13 wherein the change in state of the direction selection switch includes a change between an off state and either a forward state or a reverse state.

15. A soft start system for use with a universal motor, the system comprising:
   a momentary switch for switching an electrical power source, the momentary switch including a first state for actuation, the momentary switch providing a momentary switch actuation signal;
   a zero crossing detection provision for providing a zero crossing detection signal;
   a driver for switching and controlling the electrical power source, the driver having an input for receiving a driver control signal;
   a direction selection switch for switching the electrical power source, the direction selection switch providing a forward direction signal and a reverse direction signal;
   a microcontroller for performing a soft start algorithm, the microcontroller receiving the momentary switch actuation signal, the zero crossing detection signal, the forward direction signal, and the reverse direction signal, the microcontroller configured to generate a driver control signal using the soft start algorithm, the driver control signal provided to the input of the driver;
   wherein the direction selection switch and the momentary switch are configured such that if the momentary switch is in the first state for actuation, and the direction selection switch provides the forward direction signal, the universal motor operates in a forward direction.

16. The soft start system of claim 15 wherein the driver is a TRIAC driver.

17. The soft start system of claim 15 wherein the soft start system is free of a current sensor.

18. An electrical power circuit for use with a universal motor, the power circuit comprising:
   a momentary switch;
   a direction selection switch;
   a soft start system;
   at least one direction feedback signal from the direction selection switch to the soft start system;
   wherein the direction selection switch includes a first state for a reverse direction of the universal motor, a second state for no rotation of the universal motor, and a third state for a forward direction of the universal motor;
   wherein the direction selection switch is configured to change the direction of rotation of the universal motor, the momentary switch includes a first state for actuation and a second state for de-actuation; and
   wherein the direction selection switch and the momentary switch are configured such that if the momentary switch is in the first state for actuation, and the direction selection switch is in the first state for the reverse direction of the universal motor, the universal motor operates in a reverse direction.

19. The electrical power circuit of claim 18 wherein the at least one direction feedback signal includes a reverse direction signal from the direction selection switch to the soft start system.

20. The electrical power circuit of claim 18 wherein the soft start system includes (i) a zero crossing detection provision providing a zero crossing detection signal, (ii) a driver for switching and controlling an electrical power source, the driver having an input for receiving a driver control signal, and (iii) a microcontroller for performing a soft start algorithm;
   wherein the momentary switch provides a momentary switch actuation signal;
   wherein the direction selection switch provides a forward direction signal and a reverse direction signal;
   wherein the microcontroller receives the momentary switch actuation signal, the zero crossing detection signal, the forward direction signal, and the reverse direction signal, the microcontroller configured to generate a driver control signal using the soft start algorithm, the driver control signal provided to the input of the driver.

21. The electrical power circuit of claim 20 wherein the driver is a TRIAC driver.

22. The electrical power circuit of claim 20 wherein the soft start system is free of a current sensor.

23. The electrical power circuit of claim 18 wherein the direction selection switch is a mechanical direction selection switch.

24. The electrical power circuit of claim 18 wherein the at least one direction feedback signal is provided by a direction detection circuit.

25. The electrical power circuit of claim 24 wherein the direction detection circuit includes a forward direction detection circuit and a reverse direction detection circuit.

26. The electrical power circuit of claim 25 wherein the forward direction detection circuit and the reverse direction detection circuit detect a direction of rotation of the universal motor.

27. The electrical power circuit of claim 18 wherein the direction selection switch directly controls a direction of rotation of the universal motor.

28. The electrical power circuit of claim 18 wherein the direction selection switch is free from direct communication with a microcontroller configured to generate a driver control signal.

29. The electrical power circuit of claim 18 wherein the soft start system detects a direction of rotation of the universal motor.

30. The electrical power circuit of claim 18 wherein the electrical power circuit is configured such that upon actuation of the momentary switch, and upon a change in state of the direction selection switch, the soft start system is initiated.

31. The electrical power circuit of claim 30 wherein the change in state of the direction selection switch includes a change between an off state and either a forward state or a reverse state.

* * * * *